Patented Nov. 6, 1928.

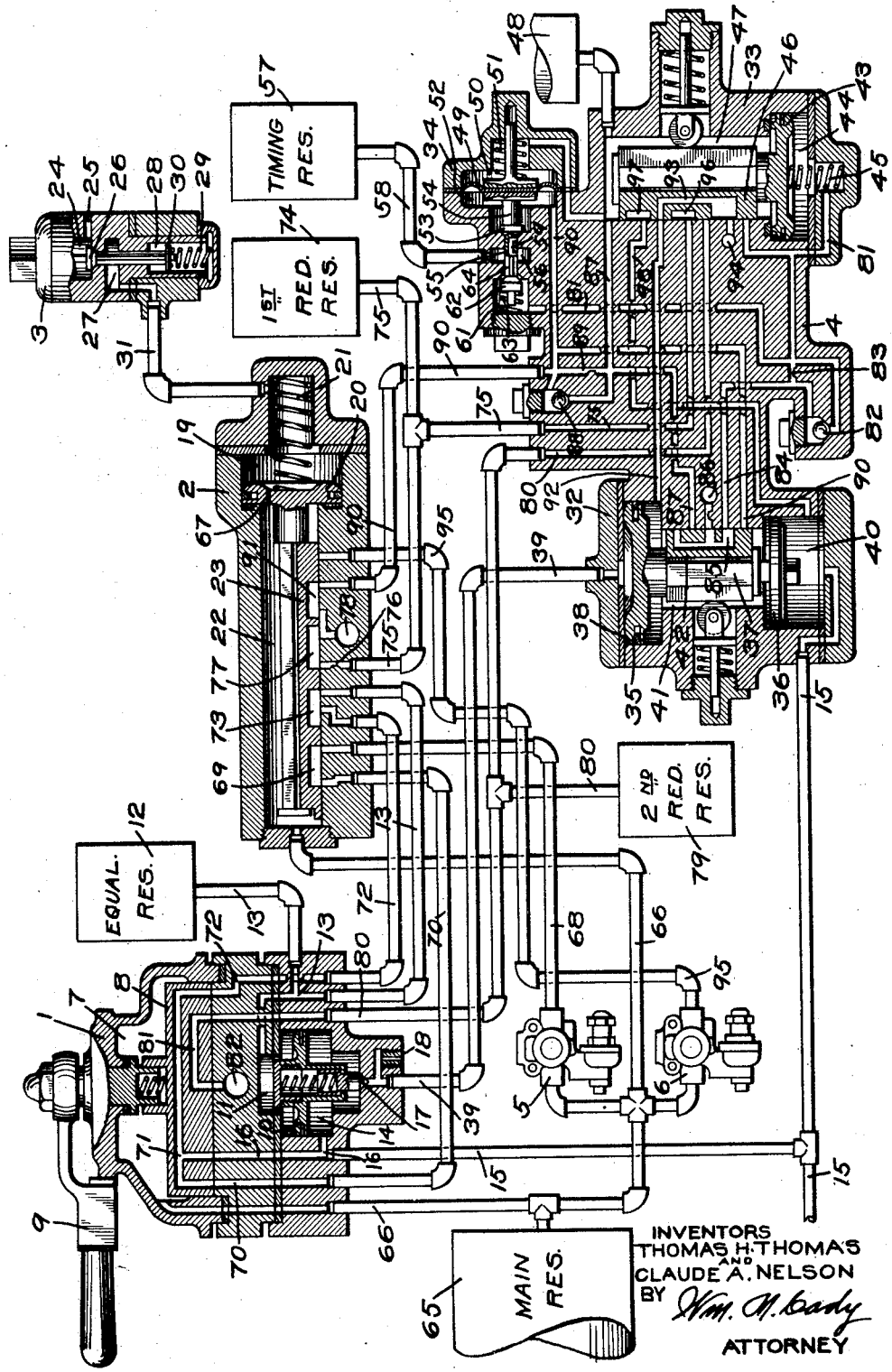

1,690,315

UNITED STATES PATENT OFFICE.

THOMAS H. THOMAS, OF EDGEWOOD, AND CLAUDE A. NELSON, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

SPLIT REDUCTION DEVICE.

Application filed July 11, 1927. Serial No. 204,876.

This invention relates to fluid pressure brakes and more particularly to the type having means for effecting successive reductions in brake pipe pressure.

The principal object of our invention is to provide means, whereby the time from the start of the first to the start of the second reduction in brake pipe pressure, varies as the length of the train varies, regardless of the degree of leakage of fluid under pressure from the brake pipe to the atmosphere.

Another object of the invention is to provide means, which, in a train of a given length, will maintain the time of the start of the second reduction in brake pipe pressure substantially constant, regardless of brake pipe leakage, that is to say, that no matter what the degree of brake pipe leakage may be, the second reduction, in successive applications of the brake, will be started at substantially the same time, measured from the start of the first reduction.

Other objects and advantages will appear in the following more detailed description of the invention.

In the accompanying drawing, the single figure is a diagrammatic, sectional view of a brake application control apparatus, embodying our invention.

As shown in the drawing, the brake application control apparatus may comprise an automatic brake valve device 1, of the usual type, a brake application valve device 2, adapted to be controlled in operation by a magnet valve device 3, a split or two stage reduction valve device 4 and two feed valve devices 5 and 6.

The automatic brake valve device 1 may comprise a casing, having a chamber 7, containing a rotary valve 8, adapted to be operated by a handle 9 and also containing an equalizing piston 10, forming, at one side, a chamber 11, connected to an equalizing reservoir 12 through pipe and passage 13, and at the opposite side, forming a chamber 14 connected to the brake pipe 15 through passage 16. The equalizing piston 10 is adapted to operate a discharge valve 17, for controlling the venting of fluid under pressure from the brake pipe 15 to the atmosphere, through the choked plug 18.

The brake application valve device 2 may comprise a casing having a chamber 19, containing a piston 20 and a spring 21 opposing outward movement of said piston, and also has a slide valve 23, contained in a chamber 22, and adapted to be operated by said piston.

The magnet valve device 3 may comprise a casing, containing a magnet and having a chamber 24 connected to the atmosphere through a passage 25, said chamber containing a valve 26, adapted to be operated by said magnet. The fluted stem of valve 26 extends through an opening in the casing wall and a cavity 27 formed in said wall and terminates in a chamber 28, wherein downward movement of the valve is opposed by the pressure of a spring 29 acting on a thrust washer 30, which washer engages the lower end of the valve stem. The cavity 27 in the casing wall is connected to the brake application valve piston chamber 19 through a passage and pipe 31.

The split or two stage reduction valve device 4 may comprise a casing containing a control portion 32, a hold back portion 33 and a charging valve portion 34.

The control portion 32 of the split reduction valve device may comprise the pistons 35 and 36, having differential areas and connected by a member 37, there being formed at one side of the piston 35 a chamber 38, which is connected to the seat of the brake pipe discharge valve 17 in the brake valve device 1, by way of pipe 39, while a chamber 40 is formed at one side of the piston 36 and is connected to the brake pipe 15. A chamber 41 is formed intermediate said pistons and contains a slide valve 42, adapted to be operated by said pistons.

The hold back portion 33 of the split reduction valve device may comprise a piston 43, contained in a chamber 44, and outward movement of such piston is opposed by a spring 45. This portion 33 also comprises a slide valve 46 contained in a valve chamber 47 and adapted to be operated by said piston, said chamber 47 being in constant communication with a volume or delay reservoir 48.

The charging valve portion 34 of the split reduction valve device 4, may comprise a diaphragm head 49, forming at one side a chamber 50, connected to the hold back valve chamber 47 and containing a spring 51 opposing movement of said diaphragm head to the right, and forming, at the opposite side, a chamber 52, containing a valve 53, adapted to be operated by a stem 54, carried by the diaphragm head 49. This valve 53 has a stem 55, slidable through an opening in a wall of the casing and into a chamber 56 formed in the casing, said chamber being connected to a timing reservoir 57 through pipe 58. The valve stem 55 contains a port 59, which, when the valve is unseated, establishes a communication between the chambers 56 and 52, and when the valve is seated, such communication is cut off.

The casing of the charging valve portion 34 has formed therein, a chamber 61, which contains a valve 62, and a spring 63 opposing the unseating of said valve. The valve 62 has a fluted stem 64, extending through an opening in the casing wall and in chamber 56 engages the stem 55 of valve 53. The valve stems 55 and 64 are of such a length, that, when either one of the valves 53 or 62 is seated, the other is unseated.

In operation, fluid under pressure from a main reservoir 65 is supplied to the rotary valve chamber 7 of the brake valve device 1 and to valve chamber 22 of the brake application valve device 2, through pipes 66, and from valve chamber 22 to piston chamber 19, through a port 67 in the piston 20.

With a train running in clear territory, or under favorable track conditions, the magnet valve device 3 is energized and the valve 26 thereof is seated, so that the fluid under pressure flowing through port 67 in the piston 20, builds up a pressure in piston chamber 19 and chamber 27, of the magnet valve device, equal to the pressure of fluid in valve chamber 22, so that the pressure of spring 21 will hold piston 20 and slide valve 23 in their release position, as shown in the drawing.

Fluid at the pressure carried in the brake pipe is supplied by the feed valve device 5 to pipe 68, and from thence it flows through cavity 69 in the application slide valve 23 to pipe and passage 70 leading to the seat of the rotary valve 8 of the brake valve device. With the brakes released and the brake valve device 1 in the running position, as shown, port 71 in the rotary valve connects passage 70 to the brake pipe 15 by way of passage 16, so that fluid at feed valve pressure from passage 70 is permitted to flow to the brake pipe 15 and to the equalizing piston chamber 14 and charge same.

Fluid at the pressure supplied by the feed valve 5 is also supplied to the equalizing reservoir 12 and equalizing piston chamber 11 from port 71 in the rotary valve 8, by way of passage and pipe 72, cavity 73 in the application slide valve 23 and pipe and passage 13. The fluid pressures thus being substantially equal on opposite sides of the equalizing piston 10, the discharge valve 17 is held seated, and the control piston chamber 38 of the split reduction device 4 is vented to the atmosphere, through the pipe 39 and choke plug 18 in the brake valve device 1. Since the control piston chamber 40 of the split reduction device is normally charged to brake pipe pressure, by way of passage 15, the pistons 35 and 36 and the slide valve 42 are held in the positions, shown in the drawing.

With the brake application valve device 2 in release position, a first reduction reservoir 74 is vented to the atmosphere through a pipe 75, a choked passage 76, cavity 77 in the application slide valve 23 and an atmospheric port 78, while, with the brake valve device 1 in the usual running position, a second reduction reservoir 79 is vented to the atmosphere by way of pipe and passage 80, cavity 81 in the rotary valve 8 and the atmospheric passage 82.

The hold back piston chamber 44 of the split reduction valve device is connected to the atmosphere when the control pistons 35 and 36 are in their normal or upper positions, by way of passage 81, past the ball check valve 82 and at the same time through the choked passage 83, and then through passage 84, port 85 in the control portion slide valve 42 and the choked atmospheric passage 86. The timing reservoir 57 being connected to passage 81, by way of chamber 56, past the unseated valve 62, and through chamber 61, is also vented to the atmosphere through the atmospheric passage 86. The hold back valve chamber 47, volume or delay reservoir 48 and diaphragm chamber 50 are vented to the atmosphere by way of passage 87, past the ball check valve 88 and at the same time through the choked passage 89, and then through pipe 90, cavity 91 in the application slide valve 23 and the atmospheric passage 78. Since the diaphragm chamber 52 is normally vented to the atmosphere through passage and pipe 90, and diaphragm chamber 50 is also normally vented, the pressure of spring 51 holds the valve 53 seated and the valve 62 unseated.

The piston chamber 44 and valve chamber 47 of the hold back portion 33, being normally at atmospheric pressure, the pressure of spring 45 holds the piston 43 and slide valve 46 in the position, as shown in the drawing, in which position, the control valve chamber 41 is vented to the atmosphere, by way of passage 92, port 93 in the hold back slide valve 46 and the atmospheric passage 94.

If the train enters territory governed by unfavorable track conditions, the magnet valve device 3 is deenergized, which permits the pressure of spring 29 to unseat the valve 26, thereby connecting the chamber 27 to the atmosphere through passage 25. The application piston chamber 19 being connected to chamber 27, the fluid under pressure therein is also vented to the atmosphere and the pressure of the fluid in the application valve chamber 22 then shifts the application piston 20 and slide valve 23, to their outward or application position, in which position, further flow of fluid from the feed valve device 5 to the brake pipe 15, through cavity 69 in the application slide valve 23, is prevented.

At substantially the same time as the supply of fluid under pressure to the brake pipe is cut off, cavity 73 in the slide valve 23 connects passage 13 to the choked passage 76 and fluid under pressure from the equalizing reservoir 12 and equalizing piston chamber 11 is then permitted to flow into the first reduction reservoir 74, through passages and pipe 13, choked passage 76 and pipe 75, until the pressures in the equalizing reservoir 12, chamber 11 and the first reduction reservoir 74 become equalized at a pressure lower than that of the initial pressure of fluid in the reservoir 12 and chamber 11. By thus decreasing the pressure of the fluid in the equalizing piston chamber 11, the higher brake pipe pressure in the equalizing piston chamber 14 shifts the equalizing piston 10 upwardly and opens the brake pipe discharge valve 17, which permits fluid to be discharged from the brake pipe 15 into pipe 39 and control piston chamber 38 of the split reduction device 4. The flow area through the choke plug 18 is less than the flow area past the open discharge valve 17 in the brake valve device 1, so that the fluid discharged from the brake pipe, builds up a pressure in the control piston chamber 38, and due to this built up pressure acting upon the piston 35, which is of greater area than the piston 36, the connected pistons 35 and 36 and the slide valve 42 are shifted downwardly against the brake pipe pressure acting on the piston 36 in the chamber 40, until the port 85 in the slide valve connects the passages 87, 84, and 90.

Upon movement of the application slide valve 23 to application position, fluid at the pressure supplied by the feed valve device 6 is supplied to the diaphragm chamber 52 of the charging portion 34 of the split reduction device, through pipe and passage 95, cavity 91 in the application slide valve 23 and pipe and passage 90. Since the diaphragm chamber 50 is normally at atmospheric pressure, the pressure of the fluid in chamber 52 shifts the diaphragm head 49 to the right, against the pressure of spring 51, which permits the pressure of spring 63 to seat the valve 62 and at the same time unseat the valve 53. With valve 53 unseated, fluid under pressure from the diaphragm chamber 52 flows to the timing reservoir 57 through the port 59 in the valve 53, chamber 56 and pipe 58, at a predetermined fast rate, which is governed by the size of the port 59 in the valve stem 55.

Fluid at the pressure supplied by the feed valve device 6 also flows through the choked passage 89 and through passage 87 to the hold back valve chamber 47, the volume or delay reservoir 48 and the diaphragm chamber 50, at a predetermined rate governed by the size of the choked portion of the passage 89.

Upon the downward movement of the control pistons 35 and 36 and the slide valve 42 as hereinbefore described, fluid at the pressure supplied by the feed valve device 6 flows from passage 90 to the hold back valve chamber 47, the volume or delay reservoir 48 and the diaphragm chamber 50, through port 85 in the control slide valve 42 and passage 87, and from passage 90 to the hold back piston chamber 44 through said port 85, passage 84, the choked passage 83 and passage 81. When the pressure in diaphragm chamber 50 equalizes with the pressure in diaphragm chamber 52, the pressure of spring 51 shifts the diaphragm head 49 to the left, thereby closing valve 53, and unseating valve 62, which permits further charging of the timing reservoir 57 through the passage 81 at a predetermined slower rate. The hold back piston chamber 44 and valve chamber 47 are charged, as above described, at such a rate that during the first reduction, the pressure of spring 45 maintains the hold back piston 43 and slide valve 47 in the first reduction position, as shown in the drawing.

When the brake pipe pressure, in the equalizing piston chamber 14, is decreased a degree slightly less than the equalizing reservoir pressure, in the equalizing piston chamber 11, the fluid under pressure in this chamber 11 causes the equalizing piston 10 to be shifted to seat the brake pipe discharge valve 17, and thus prevent further flow of fluid under pressure from the brake pipe 15 to the atmosphere and to the control valve portion 32. After the discharge valve 17 is thus seated, the fluid under pressure in the control piston chamber 38 is vented to the atmosphere through pipe 39 and the choke plug 18 in the brake valve device, and the brake pipe pressure, acting on the control piston 36, in the control portion of the split reduction device, then shifts the control pistons 36 and 35 and the slide valve 42 upwardly, to the position shown in the drawing, in which position the supply of fluid to the timing reservoir 57 and the hold back piston chamber 44 is cut off and said reservoir and chamber are connected to the atmosphere through the passage 81, past the ball check valve 82 and at the same time through the choked passage 83 and then through passage 84, port 85 in the control slide valve 42 and the choked atmospheric passage 86.

When the pressure in the timing reservoir 57 and hold back piston chamber 44 is reduced to a predetermined pressure, by the means just described, the fluid at feed valve pressure in the hold back valve chamber 47 shifts the hold back piston 43 and slide valve 46 downwardly, against the pressure of the spring 45, to the second reduction position, in which position port 93, in the control slide valve 46, connects the piston chamber 44 to the atmosphere through passage 81, and the atmospheric passage 94, and cavity 96 in said slide valve connects the first reduction reservoir 74 to the second reduction reservoir 79, thereby permitting the fluid under pressure from the first reduction reservoir 12 to flow to the second reduction reservoir 79 and cause a further decrease in pressure in the equalizing piston chamber 11, with the result that the discharge valve 17 is again opened by the pressure of fluid from the brake pipe and a further reduction in brake pipe pressure occurs, in the same manner as hereinbefore described.

In second reduction position of the hold back portion 33 of the split reduction device, cavity 97 in the slide valve 46 connects the valve chamber 41, to the brake pipe 15, through passages 92, 98 and the control piston chamber 40, so that when effecting the second reduction, the fluid under pressure discharged from the brake pipe to the control piston chamber 38, is unable to shift the control pistons 35 and 36 and slide valve 42, down to the first reduction position, against the brake pipe pressure in the chamber 41.

If it is desired to limit the degree of brake pipe reduction, the brake valve device 1 is moved to the usual lap position, in which position the atmospheric connection of the second reduction reservoir 79, through pipe and passage 80, cavity 81 in the rotary valve 8 and the atmospheric passage 82, is lapped and the degree of brake pipe reduction will then correspond substantially to the equalization of pressures in the equalizing reservoir 12 and the first and second reduction reservoirs 74 and 79 respectively, said degree of reduction in brake pipe pressure being sufficient to cause a full service application of the brakes. If the brake valve device is not moved to lap position, the fluid under pressure in said reservoirs will obviously be reduced to atmospheric pressure and permit complete venting of brake pipe fluid.

In order to ensure the proper gathering of the slack between the cars in a train, prior to starting the second reduction in brake pipe pressure, a predetermined time period must elapse from the start of the first to the start of the second reduction. Said time period comprises two parts, the first part being that during which the timing reservoir is charged and the second part being measured by reducing the pressure of the timing reservoir fluid to a predetermined degree, at which degree the hold back portion 33 operates to start the second reduction.

To ensure the predetermined time limit between the starting of said reductions in brake pipe pressure, for a train of a given length and regardless of the degree of leakage of fluid under pressure from the brake pipe to the atmosphere, we, according to our invention, provide the charging valve portion 34 of the split reduction device, which operates in the manner hereinbefore described, to start charging the timing reservoir 57 at a fast rate, immediately upon the movement of the application valve device 2 to application position and then to reduce the rate of charging said timing reservoir during the time the control portion 32 of the split reduction device is in the downward position during the first reduction.

If the brake pipe is subject to leakage, instead of being substantially air tight, the opening of the discharge valve 17 is delayed for a period of time proportionate to the degree of brake pipe leakage and under such conditions said discharge valve also remains open for a shorter time, since brake pipe leakage hastens the rate of effecting a brake pipe reduction. As the charging of the timing reservoir starts at a fast rate just as soon as the application valve device 2 is moved to its application position, the delay in the operation of the discharge valve, to vent fluid under pressure from the brake pipe, will permit the timing reservoir to be charged at a fast rate for a longer period of time than if the brake pipe were air tight and the discharge valve 17 operated immediately upon the application valve device 2 being moved to its application position. This results in the timing reservoir being charged to a higher pressure in a shorter period of time than it would be if the brake pipe were air tight. Thus, in the case of brake pipe leakage, the shorter charging period of the timing reservoir and the obtaining of a higher pressure in said shorter time, in addition to the longer time required to reduce said higher pressure to that at which the hold back portion 33 of the split reduction device operates to start the second reduction, produces substantially the same time limit from the start of the first to the start of the second reduction in brake pipe pressure, as is obtained in a substantially air tight brake pipe.

If, leakage of fluid under pressure from the brake pipe to the atmosphere, is so severe, as to cause an initial reduction in brake pipe pressure, as quickly as the pressure of the fluid in the equalizing reservoir 12 is reduced, the brake pipe discharge valve 17 and the control portion 32 of the split reduction valve device, will, obviously not operate for the first reduction, but, under such a condition the second reduction in equalizing reservoir pressure is started at the proper time, on account of the build up of fluid under pressure in the hold back valve chamber 47 and volume or delay reservoir 48 to a degree sufficient to shift the hold back piston 43 and slide valve 46 to the outward or second reduction position, against the opposing pressure of the spring 45.

It will be noted that, normally and during the first reduction, the control valve chamber 41 is vented to the atmosphere through passage 92, port 93 in the hold back slide valve 46, and the atmospheric passage 94, so that leakage into the valve chamber 41 past either control piston 35 or 36 can not build up a pressure in said valve chamber and prevent operation of the control portion 32 for the first reduction.

It will further be noted that, upon movement of the hold back piston 43 and slide valve 46 to the outward or second reduction position, the valve chamber 41 of the control portion 32 is connected to the piston chamber 40 of said portion, through passage 92, cavity 97 in the hold back slide valve 46, and passage 98, thereby permitting fluid at brake pipe pressure, from piston chamber 40, to flow to the valve chamber 41 and prevent the control pistons 35 and 36 and slide valve 42 from being shifted downward, to the first reduction position, during the second reduction. It is undesirable to have the control portion 32 in first reduction position during the second reduction, because it would permit a flow of fluid under pressure from passage 90 to the atmosphere, through port 85 in the control slide valve 42, passage 84, choked passage 83, passage 81, port 93 in the hold back slide valve 46 and the atmospheric passage 94. This could not interfere with the operation of the device but would be an unnecessary waste of fluid under pressure. To prevent this objectionable condition, fluid at brake pipe pressure is employed for balancing or locking the control pistons 35 and 36 in their first reduction positions, during the second reduction, in preference to a higher pressure, such as supplied by the feed valve devices 5 or 6, since if a higher pressure were used, it might leak past the control piston 36 into the piston chamber 40 and brake pipe 15 and thereby tend to increase the reduced brake pipe pressure and interfere with the application of brakes.

Having now described our invention, what we claim as new and desire to secure by Letters Patent, is:—

1. In a fluid pressure brake, the combination with a brake pipe, of means for automatically effecting a first and a second reduction in brake pipe pressure, and means for regulating the time period elapsing between the start of the first reduction and the start of the second reduction, the last mentioned means being adapted to maintain the time of the start of the second reduction from the start of the first reduction, substantially constant, in a train of given length, regardless of the degree of brake pipe leakage.

2. In a fluid pressure brake, the combination with a brake pipe, of means for automatically effecting a first and a second reduction in brake pipe pressure, and means for regulating the time period elapsing between the start of the first reduction and the start of the second reduction, the last mentioned means being adapted to maintain the time of the start of the second reduction from the start of the first reduction, substantially constant, in a train of given length, under various degrees of brake pipe leakage.

3. In a fluid pressure brake, the combination with a brake pipe, of means for automatically effecting successive reductions in brake pipe pressure, means for regulating the time period between said reductions, the time at which the last reduction starts being substantially constant, in a train of given length, regardless of the degree of brake pipe leakage.

4. In a fluid pressure brake, the combination with a brake pipe, of means for automatically effecting successive reductions in brake pipe pressure, means for regulating the time period between said reductions, the time for effecting one reduction being variable and the time at which another reduction starts being fixed.

5. In a fluid pressure brake, the combination with a brake pipe, of means for automatically effecting successive reductions in brake pipe pressure, means for regulating the time period between said reductions, the time for effecting one reduction being governed by the degree of brake pipe leakage and the time at which a following reduction is started being fixed and independent of the effect of brake pipe leakage.

6. In a fluid pressure brake, the combination with a brake pipe, of means for automatically effecting a first and a second reduction in brake pipe pressure, and means for regulating the time of the effecting of the first reduction in accordance with the degree of brake pipe leakage, and means for maintaining substantially constant the time of the start of the second reduction, regardless of brake pipe leakage.

7. In a fluid pressure brake, the combination with a brake pipe, of means for automatically effecting a first and a second reduction in brake pipe pressure, and means for regulating the time of the effecting of the first reduction in accordance with the degree of brake pipe leakage, and means operable upon the start of the first reduction for maintaining the start of the second reduction at a fixed time, regardless of the degree of brake pipe leakage.

8. In a fluid pressure brake, the method of effecting and timing successive reductions in brake pipe pressure, consisting of the venting of fluid under pressure from the brake pipe for a period of time governed by the degree of brake pipe leakage, at the same time storing fluid under pressure at two different rates governed by the degree of brake pipe leakage, and during the first reduction in brake pipe pressure venting the fluid so stored, to effect the second reduction in brake pipe pressure at a fixed time, independent of brake pipe leakage.

9. In a fluid pressure brake, the method of effecting and timing successive reductions in brake pipe pressure, consisting of the venting of fluid under pressure from the brake pipe for a period of time governed by the degree of brake pipe leakage, at the same time storing fluid under pressure at two different rates, then venting the fluid so stored to effect a second reduction in brake pipe pressure, the time of the start of the second reduction being fixed by the storing and venting of fluid during the effecting of the first reduction in brake pipe pressure.

10. In a fluid pressure brake, the combination with a brake pipe and means for effecting a reduction in brake pipe pressure, of a timing reservoir, means for charging and venting said reservoir while the said reduction in brake pipe pressure is being effected, and means for effecting a second reduction in brake pipe pressure when the pressure in said reservoir is reduced a predetermined degree, the time of the start of the second reduction being fixed by the operation of the second mentioned means.

11. In a fluid pressure brake, the combination with a brake pipe and means for effecting a first reduction in brake pipe pressure, of a timing reservoir adapted to be charged with fluid under pressure at two different rates during the first reduction in brake pipe pressure, means operated upon a predetermined reduction in pressure in said reservoir for effecting a second reduction in brake pipe pressure, and means for reducing the pressure in said reservoir.

12. In a fluid pressure brake, the combination with a brake pipe, of means for effecting a first reduction in brake pipe pressure, a timing reservoir adapted to be charged with fluid under pressure at two different rates during the first reduction in brake pipe pressure, the time of each rate of charge being variable in accordance with the degree of brake pipe leakage, and means for venting the fluid under pressure from said reservoir to effect a second reduction in brake pipe pressure.

13. In a fluid pressure brake, the combination with a brake pipe, of means for effecting a first reduction in brake pipe pressure, a timing reservoir adapted to be charged with fluid under pressure at a fast rate for a period of time governed by the degree of brake pipe leakage, and at a slower rate for a period of time governed by the pressure of the fluid discharged from said brake pipe, and means for discharging the fluid under pressure from said reservoir at a predetermined rate to effect a second reduction in brake pipe pressure.

14. In a fluid pressure brake, the combination with a brake pipe, of means for effecting a first reduction in brake pipe pressure, a timing reservoir adapted to be charged with fluid under pressure at a fast rate for a period of time governed by the degree of brake pipe leakage, and at a slower rate for a period of time governed by the pressure of the fluid discharged from said brake pipe, and means for discharging the fluid under pressure from said reservoir at a predetermined rate to effect a second reduction in brake pipe pressure at a fixed time regardless of said leakage.

15. In a fluid pressure brake, the combination with a brake pipe, of means for effecting a first reduction in brake pipe pressure, a timing reservoir adapted to be charged with fluid under pressure at a fast rate for a period of time governed by the degree of brake pipe leakage and at a slower rate for a period of time governed by the pressure of the fluid discharged from said brake pipe, and means for discharging the fluid under pressure from said reservoir at a predetermined rate to effect a second reduction in brake pipe pressure, the charging and discharging of said reservoir determining the time of the start of the second reduction in brake pipe pressure.

16. In a fluid pressure brake, the combination with a brake pipe, of means for automatically effecting successive reductions in brake pipe pressure including means for discharging fluid under pressure from said brake pipe to effect an initial reduction in brake pipe pressure over a period of time governed by the degree of brake pipe leakage, a timing reservoir adapted to be charged at different rates with fluid under pressure while the first reduction in brake pipe pressure is being effected, the time period of each charging rate being variable as said brake pipe leakage varies, and means for venting the fluid under pressure from said reservoir to effect a second reduction in brake pipe pressure.

17. In a fluid pressure brake, the combination with a brake pipe, of means for automatically effecting successive reductions in brake pipe pressure including means for discharging fluid under pressure from said brake pipe to effect an initial reduction in brake pipe pressure over a period of time governed by the degree of brake pipe leakage, a timing reservoir adapted to be charged with fluid under pressure while the first reduction in brake pipe pressure is being effected, the pressure of the fluid in said reservoir varying as the brake pipe leakage varies, and means for venting the fluid under pressure from said reservoir to effect a second reduction in brake pipe pressure.

18. In a fluid pressure brake, the combination with a brake pipe, of means for automatically effecting successive reductions in brake pipe pressure including means for discharging fluid under pressure from said brake pipe to effect an initial reduction in brake pipe pressure over a period of time governed by the degree of brake pipe leakage, a timing reservoir adapted to be charged with fluid under pressure while the first reduction in brake pipe pressure is being effected, the pressure of the fluid in said reservoir varying as the brake pipe leakage varies, and means for venting the fluid under pressure from said reservoir to effect a second reduction in brake pipe pressure, the time of the start of the second reduction being governed by the time of the charging and venting of said reservoir.

19. In a fluid pressure brake, the combination with a brake pipe, of two reduction reservoirs, a timing reservoir, means whereby fluid under pressure is vented to one of said reduction reservoirs to cause an initial reduction in brake pipe pressure and whereby the start of the charging of said timing reservoir is at a fast rate, means operable upon the initial reduction in brake pipe pressure for changing the charging rate of said timing reservoir, and operable by fluid under pressure from said brake pipe for venting fluid from said timing reservoir to cause said reduction reservoirs to be connected to effect a second reduction in brake pipe pressure.

20. In a fluid pressure brake, the combination with a brake pipe, of two reduction reservoirs, a timing reservoir, means whereby fluid under pressure is vented to one of said reduction reservoirs to cause an initial reduction in brake pipe pressure and whereby the start of the charging of said timing reservoir is at a fast rate, means operable upon the initial reduction in brake pipe pressure for changing the charging rate of said timing reservoir, and operable by fluid under pressure from said brake pipe for terminating the charging of said timing reservoir and for venting fluid under pressure from said reservoir to cause said reduction reservoirs to be connected to effect a second reduction in brake pipe pressure.

21. In a fluid pressure brake, the combination with a brake pipe, of means for effecting successive reductions in brake pipe pressure including a control valve device adapted to be moved from its normal position during the effecting of the first reduction in brake pipe pressure and to be moved again to its normal position to effect a second reduction in brake pipe pressure, said valve device being locked in its latter position, from the start of the second reduction, by fluid under pressure from said brake pipe.

22. In a fluid pressure brake, the combination with a brake pipe, of means for effecting successive reductions in brake pipe pressure including a control valve device and a hold back piston device, said control valve device being adapted to be moved from its normal position during the effecting of the first reduction in brake pipe pressure for supplying fluid under pressure to said hold back piston device, and being adapted to be moved back to its normal position to vent fluid under pressure from said hold back piston device to cause it to operate to supply fluid under pressure to said control valve device to lock said control valve device in its latter position during the second reduction in brake pipe pressure.

23. In a fluid pressure brake, the combination with a brake pipe, of an equalizing reservoir, a valve mechanism subject to the opposing pressures of the brake pipe and the equalizing reservoir for controlling the venting of fluid from the brake pipe, a plurality of reduction reservoirs, a timing reservoir, valve means operative to connect one of said reduction reservoirs with the equalizing reservoir and to connect a fluid pressure supply device with said timing reservoir, a valve device operative for controlling the charging of the timing reservoir, at two different rates, with fluid under pressure from said supply device, a control valve device for controlling the operation of said valve device and for venting fluid under pressure from said timing reservoir, and means operative, upon a predetermined reduction in timing reservoir pressure, to connect the second reduction reservoir with said equalizing reservoir.

24. In a fluid pressure brake, the combination with a brake pipe, of a valve mechanism for venting fluid from the brake pipe to effect a reduction in brake pipe pressure, a timing reservoir, means operable to start the first reduction in brake pipe pressure and to start the charging of said reservoir at a fast rate, means subject to the pressure of fluid vented from said brake pipe for controlling the charging of said reservoir at a slower rate, said means, after a period of time governed by the degree of brake pipe leakage, being subject to brake pipe pressure for venting fluid under pressure from said reservoir to effect another reduction in brake pipe pressure.

25. In a fluid pressure brake, the method of effecting a second reduction in brake pipe pressure when the first reduction in brake pipe pressure is effected by brake pipe leakage, consisting of gradually building up pressure on a valve device during the first reduction until the pressure reaches a predetermined degree at which time the pressure so built up causes said valve device to operate to effect the second reduction in brake pipe pressure.

26. In a fluid pressure brake, the combination with a brake pipe and means for effecting a second reduction in brake pipe pressure when the first reduction is effected by the effect of brake pipe leakage, said means comprising a valve device, and means for gradually building up pressure on said valve device during the first reduction, said valve device being operable by said pressure when it has been built up a predetermined degree, to effect the second reduction in brake pipe pressure.

27. In a fluid pressure brake, the combination with a brake pipe and means for effecting a second reduction in brake pipe pressure when the first reduction is effected by the effect of brake pipe leakage, said means comprising a valve device, and means for gradually building up pressure on said valve device during the first reduction, said valve device being operable by said pressure when it has been built up a predetermined degree, to effect the second reduction in brake pipe pressure, the time of the start of the second reduction being substantially the same as when the brake pipe leakage is not excessive.

28. In a fluid pressure brake, the combination with a brake pipe and means for effecting a second reduction in brake pipe pressure when the first reduction is effected by the effect of brake pipe leakage, said means comprising a valve device, and means for gradually building up pressure on said valve device during the first reduction, said valve device being operable by said pressure when it has been built up a predetermined degree, to effect the second reduction in brake pipe pressure, the start of the second reduction being delayed from the start of the first reduction for a substantially constant time period.

29. In a fluid pressure brake, the combination with a brake pipe and means for effecting a second reduction in brake pipe pressure when the first reduction is effected by the effect of brake pipe leakage, said means comprising a valve device, and means for gradually building up pressure on said valve device during the first reduction, said valve device being operable by said pressure when it has been built up a predetermined degree, to effect the second reduction in brake pipe pressure, the second reduction starting at or after a substantially fixed time.

30. The combination with a brake pipe, of a timing reservoir, means for effecting a reduction in brake pipe pressure in two stages, the fixing of the time period between the two stages by the operation of said means being dependent on the pressure in said reservoir, and means for charging said reservoir with fluid under pressure at one rate when fluid is being vented from the brake pipe and at another rate when fluid is not being vented from the brake pipe.

31. The combination with a brake pipe, of means for effecting a reduction in brake pipe pressure in two stages including a timing reservoir, and means for charging said reservoir with fluid under pressure at different rates according to whether or not fluid is being vented from the brake pipe.

32. The combination with a brake pipe, of means for effecting a reduction in brake pipe pressure in two stages including a timing reservoir, and means for charging said reservoir with fluid under pressure at a fast rate when fluid is not being vented from the the brake pipe and at a slow rate when fluid is being being vented from the brake pipe.

33. The combination with a brake pipe, of means for effecting a reduction in brake pipe pressure in two stages including a timing reservoir, and means for charging said reservoir with fluid under pressure at a fast rate when fluid is not being vented from the brake pipe and for retarding said rate when fluid is being vented from the brake pipe.

In testimony whereof we have hereunto set our hands this 8th day of July, 1927.

THOMAS H. THOMAS.
CLAUDE A. NELSON.